US006594748B1

(12) United States Patent
Lin

(10) Patent No.: US 6,594,748 B1
(45) Date of Patent: Jul. 15, 2003

(54) METHODS AND STRUCTURE FOR PIPELINED READ RETURN CONTROL IN A SHARED RAM CONTROLLER

(75) Inventor: Shuaibin Lin, Boulder, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/990,698

(22) Filed: Nov. 9, 2001

(51) Int. Cl.7 .............................................. G06F 13/00
(52) U.S. Cl. ...................... 711/167; 711/154; 711/151; 711/170
(58) Field of Search ................................. 711/151, 154, 711/167, 170

(56) References Cited

U.S. PATENT DOCUMENTS

| 5,900,762 A | * | 5/1999 | Ramakrishnan ............. 327/277 |
| 6,137,333 A | * | 10/2000 | Williams et al. ............ 327/261 |
| 6,282,131 B1 | * | 8/2001 | Roy ........................... 365/191 |
| 6,424,198 B1 | * | 7/2002 | Wolford ...................... 327/291 |
| 6,438,670 B1 | * | 8/2002 | McClannahan ............. 711/167 |
| 2002/0013881 A1 | * | 1/2002 | Delp et al. .................. 711/105 |

OTHER PUBLICATIONS

TDB–ACC–NO: NN94085519, IBM Technical Disclosure Bulletin, Programmable Delay LIne Control Signal Circuits, Aug. 1004, Vol. No. 37, Issue No. 8, pp. 519–520.*

* cited by examiner

Primary Examiner—Reba I. Elmore
(74) Attorney, Agent, or Firm—Lathrop & Gage

(57) ABSTRACT

A programmable delay feature useful to reduce contention related delays between a memory controller device and a plurality of master devices sharing access to a memory subsystem through the single memory controller device. The programmable delay line is programmed to an optimal delay value for each master device prior to returning data to the requesting master device. A configuration register associated with the memory controller stores the optimal value for the delay line for the present application of the controller. Firmware operable on a processor coupled to the memory controller (or other programmable master device) may determine the optimal delay line value for the system. The optimal delay line value so determined is then stored in the memory controller's configuration register.

17 Claims, 3 Drawing Sheets

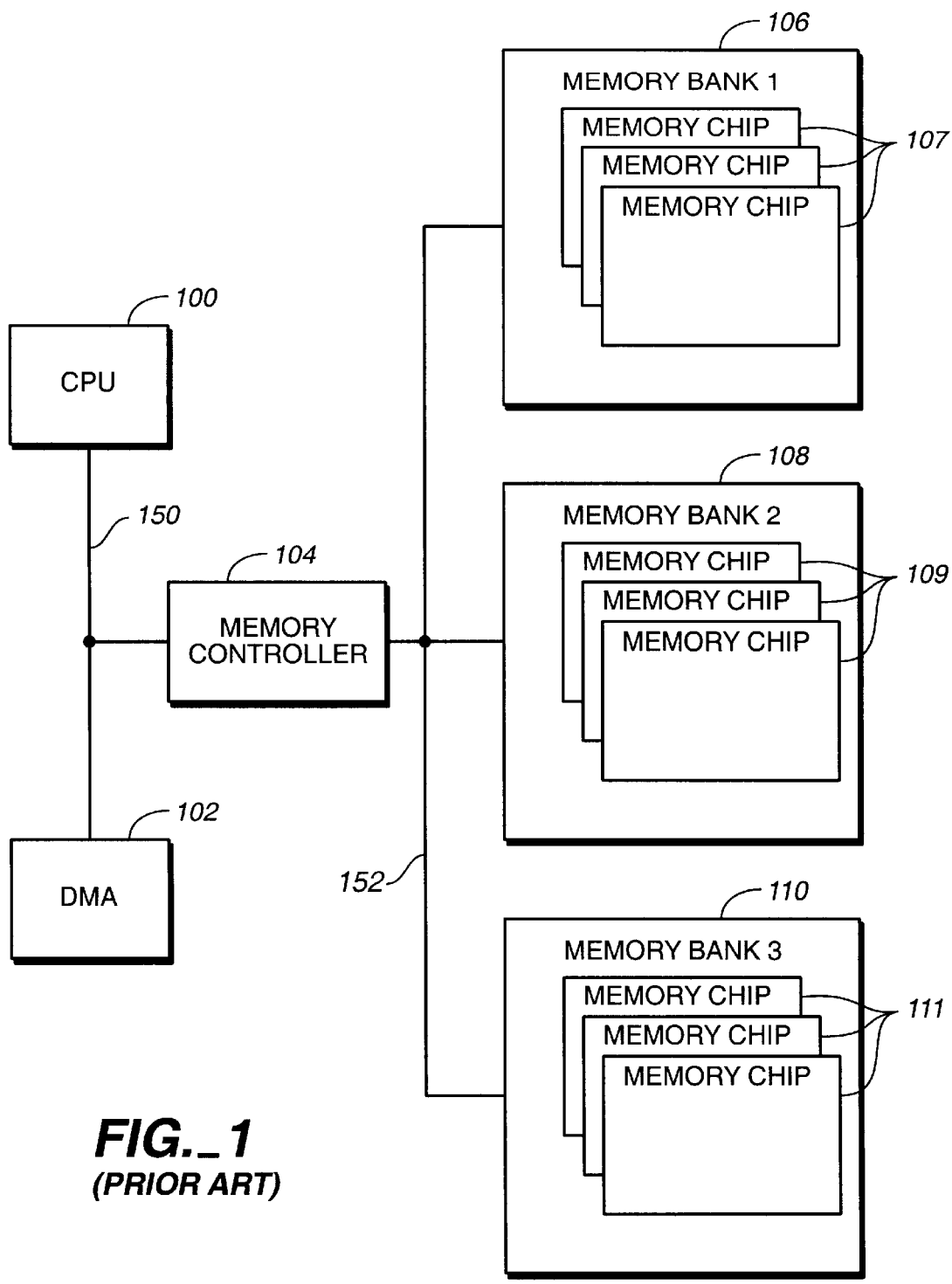
FIG._1
(PRIOR ART)

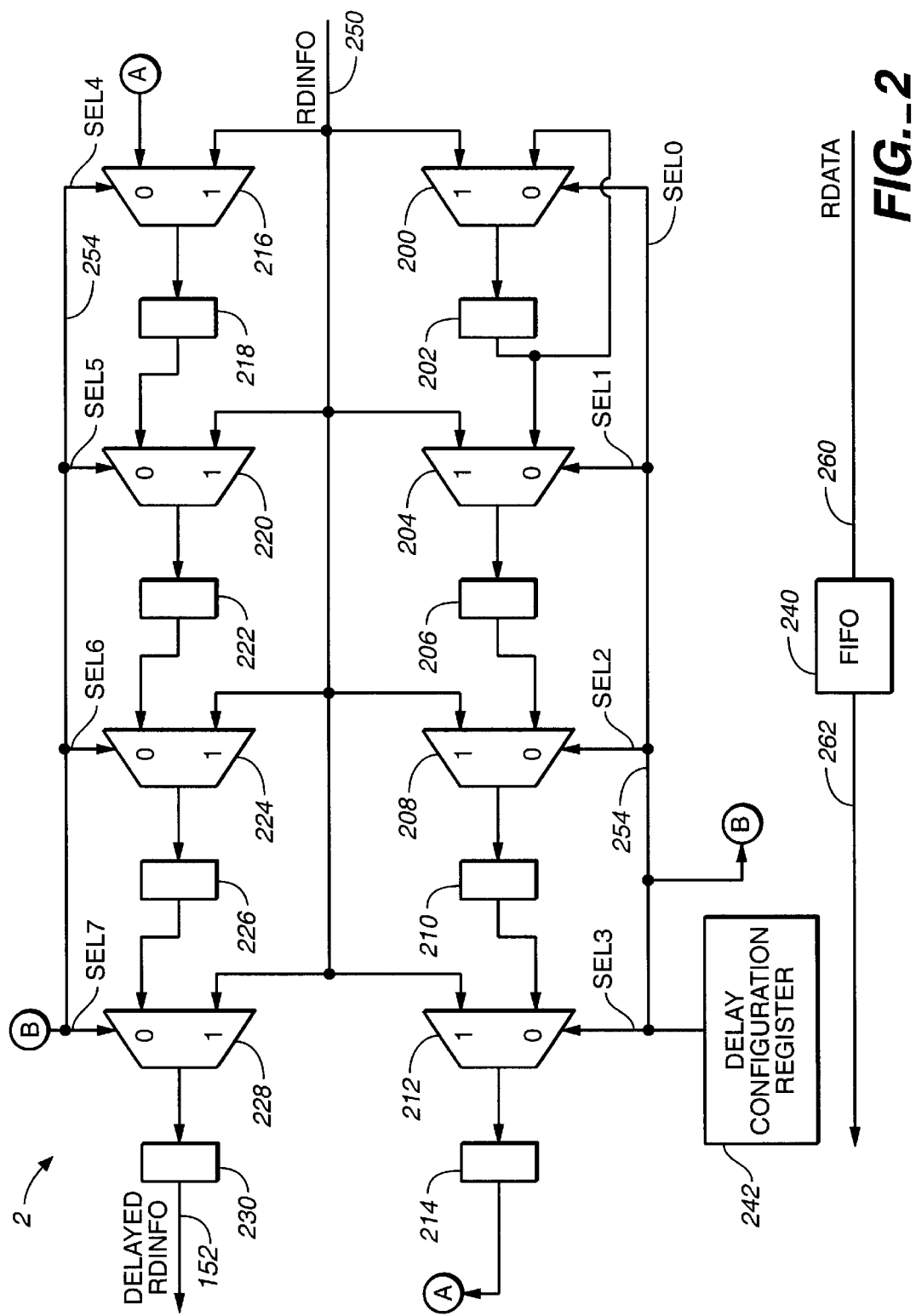

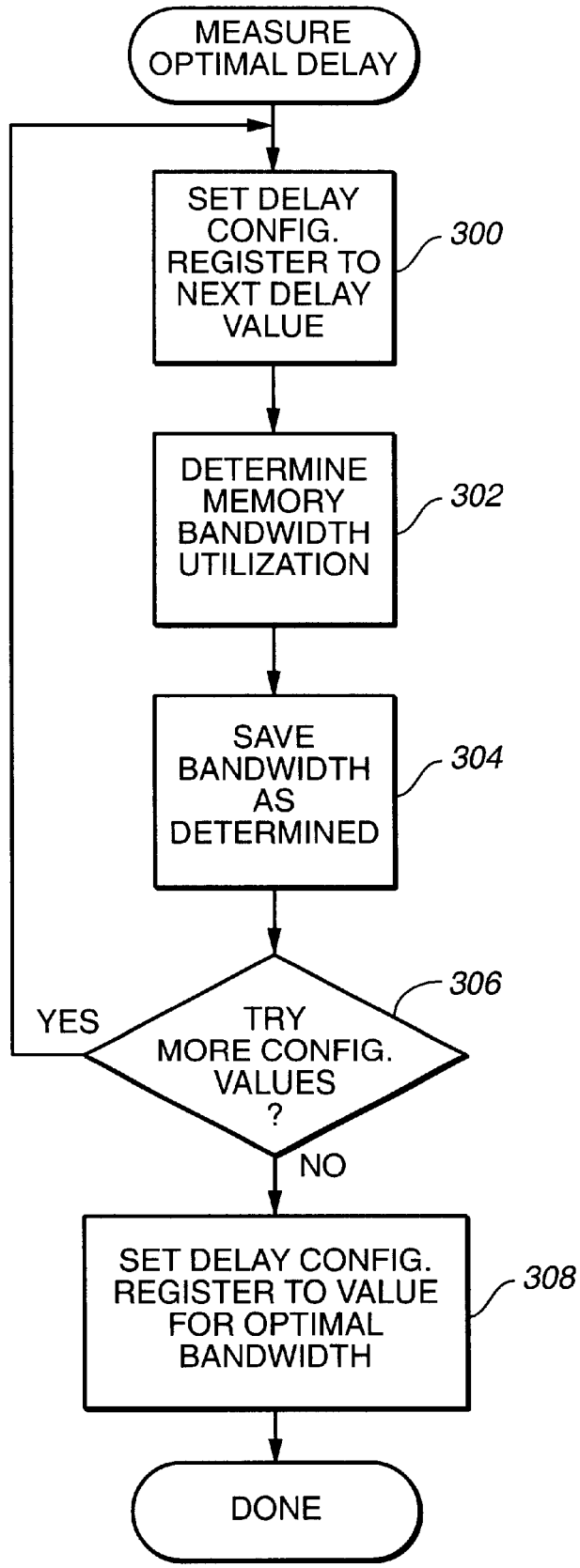
FIG._3

METHODS AND STRUCTURE FOR PIPELINED READ RETURN CONTROL IN A SHARED RAM CONTROLLER

BACKGROUND OF THE INVENTION

1. Field of the Invention

The present invention relates to memory controller architectures in computing systems. More specifically, the present invention relates to methods and structure for providing a flexible, pipelined read return control structure for high-performance memory subsystems shared by multiple processors.

2. Discussion of Related Art

In general, it is known in computing systems that a processor or master device fetches and stores data and instructions in an associated memory subsystem. Most present day system architectures include a memory controller device intermediate the master device and memory components. The memory controller device shields the processor from details of the architecture of the memory subsystem and control mechanisms of the memory subsystem. For example, details of a controlling row and column selection for RAM chips (i.e., RAS and CAS signals), refresh operations for dynamic RAM chips, bank selection and control in multibank memory subsystems, etc. are all relegated to methods and circuits operable within the memory controller device. The system processor is coupled directly to the memory controller device as are other "master" devices such as DMA controllers and intelligent I/O processors. The memory controller device therefore includes methods and logic circuits for interfacing to the processor bus structure as well as methods and logic for controlling the memory chips of the memory subsystem and serves as an intermediary or interface between the two.

The processor or other master device issues read requests to retrieve information previously stored in the memory subsystem. The memory controller device interacts with the processor and memory elements to perform the requested read. There are typically delays between the issuance of a read by the master device and the completion of the request by return of the requested data. A number of factors are involved in these delays including round trip signal times between the processor, memory controller and memory elements as well as factors relating to the memory chips themselves. For example, timing of addressing signals applied to memory chips often have latency times associated with them (i.e., CAS latency). A system designer must carefully evaluate these factors and appropriately design the system to account for such delays. It is desirable that the master device requesting the data be ready to receive the retrieved data when it becomes available. If the master device is ready to receive the data too early, it may stall— retaining control of the bus until the memory subsystem is ready to deliver the data to the master device. If the master is ready to receive the data too late, FIFO devices in the return path for read data may be held in use thereby delaying servicing of later read requests. Where a system has but a single master device coupled to the memory subsystem, these issues are less important and may be largely ignored by a designer.

It is also known in present architectures that multiple processors or masters may be coupled to a common or shared memory subsystem. In general, such architectures include a single memory controller device capable of interacting with multiple masters over a shared processor bus. In such systems having multiple master devices, it is desirable that each master issue its read request and then release the shared bus for other transactions while awaiting and preparing for return of the requested data. Such other transactions may include, for example, other read requests by other master devices. It is common therefore to provide read return control information prior to actual return of the requested data so that bus arbitration and control logic can determine which master device is to receive the read data about to be returned from the memory subsystem. Such read return control information may include, among other things, indicia of the requesting master device (i.e., a device ID or other indicia) and information indicative of completion of the requested read transaction. There are therefore latencies associated with return of the read return control information as well as the return of the actual requested data from the memory subsystem.

In such multiple processor systems, the design problems in accounting for these latencies in memory read transactions are multiplied and more critical to overall system performance. To achieve optimal performance of a system, a system designer must provide for accurate delays in the processing of read commands to memory and the return of the requested read information. These delay times vary in accordance with a number of factors in a system design as noted above and the problems that arise from inaccurate delays are exacerbated by contention issues that arise in the context of multiple masters.

In a system with multiple masters sharing the memory subsystem, bus contention problems arise when multiple masters require simultaneous access to the memory subsystem. Resolution of such contention problems can be a significant factor in the overall system performance of such a multiple master system. If one of the simultaneous requesting masters is delayed too long in retrieving its requested data, other read requests may be delayed because the read data return path (typically including a FIFO device) is controlled by the delayed processor. If the requesting processor is not delayed long enough, it could take ownership of the read control path too early thereby precluding other masters from legitimately commencing other operations in parallel. It is important in such multiprocessor system architectures to provide accurate timing for returning requested read data from a shared memory subsystem. As noted above, incorrect timing can cause undesired stalls of processors in a multiple processor system.

Present solutions to such performance issues require a designer to correctly design a fixed delay for return of read control information to masters on the shared bus. Specific timing requirements are unique to the specific application of the memory controller and include timing requirements relating to the bus coupling the masters to the memory controller. Such fixed delay designs are inflexible where different applications of the memory controller may vary the number, types or clock speeds of processors for particular applications or where the memory controller is to be used with other masters, buses and memory subsystems having different latencies.

It is evident from the above discussion that a need exists for improved flexibility in the design of memory controller devices in a shared memory subsystem shared by multiple processors.

SUMMARY OF THE INVENTION

The present invention solves the above and other problems, thereby advancing the state of the useful arts, by providing a programmable read return delay line signal path for multiple processor system designs incorporating a shared memory subsystem. More specifically, the present invention provides for a programmable delay line signal path to customize the delay in the return of read control information to any of the multiple masters in a system. This programmable delay allows the total delay time associated with a read operation to be flexibly tuned to the needs of a particular application of the memory controller (i.e., a particular bus and a particular compliment of master devices coupled through that bus to the memory controller). A register associated with the memory controller allows the user (designer) to program the specific delay used by the corresponding system application. The delay circuit is preferably programmed at system initialization to configure the appropriate delay length for this particular application of the memory controller.

Another aspect of the present invention provides for firmware operable within a processor master device (or other programmable master device) coupled to the memory controller to determine an optimal delay value for the programmable delay line in the return of read return control information. The optimal delay is determined by trying various delay values in the configuration register of the memory controller and measuring system performance at each setting attempted. The optimal value so determined may then be written to the delay line configuration register for use by the memory controller device in this particular application.

These features permit a memory controller to be easily adapted to a variety of bus applications without need for custom designing delay lines in each new application. Rather, the memory controller of the present invention is easily adapted to each new application environment.

A first aspect of the invention provides for a system for controlling access to a memory by a master device comprising: a programmable delay line signal path having an input signal path and an output signal path coupled to the master device; read return logic circuits associated with the memory and coupled to the input signal path of the programmable delay line signal path wherein read return control signals generated by the read return logic circuits are delayed by a programmable delay period and wherein the delayed read return control signals are applied through the output signal path of the programmable delay line signal path to the master device to control return of information read from the memory by the master device.

Another aspect provides further that the programmable delay line signal path comprises: a plurality of delay flip-flops coupled in a sequential manner such that the output signal from a preceding delay flip-flop is controllably applied to the input of a next delay flip-flop and such that the output of the last delay flip-flop in the sequence of delay flip-flops is applied as the output signal path of the programmable delay line signal path to the master device as delayed read return logic.

Another aspect provides further for a configuration register having a plurality of bits wherein each bit is associated with a corresponding delay flip-flop of the plurality of delay flip-flops such that the setting of the each bit controls the selective application of the read return control signals to the corresponding delay flip-flop.

BRIEF DESCRIPTION OF THE DRAWINGS

FIG. 1 is a block diagram of a typical system using a memory controller as presently known in the art.

FIG. 2 is a block diagram of an exemplary preferred embodiment of the improved features of the present invention to flexibly program the delay of read return control data.

FIG. 3 is a flowchart of a method operable in an associated master device to determine an optimal setting for the programmable delay of the features of FIG. 2.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical system as presently known in the art wherein a memory controller 104 serves as an interface between master devices and multiple banks of memory. As depicted in FIG. 1, CPU 100 and DMA controller 102 are typical master devices that generate memory requests to be processed by memory. banks 106, 108 or 110. CPU 100 or DMA controller 102 generate memory requests and apply the requests via the bus 150 to memory controller 104. Those skilled in the art will readily recognize that a bus arbiter device (not shown) manages the coordination of such multiple master devices issuing memory requests to memory controller 104.

Memory controller 104 receives such requests and directs the read or write operations to appropriate banks of memory 106, 108 or 110. Each bank of memory, 106, 108 and 110 is comprised of a plurality of memory chip devices 107, 109 and 111, respectively. As is presently known in the art, memory controller 104 issues low-level memory operation commands via bus 152 to appropriate memory chips 107, 109 or 111 in identified memory banks 106, 108 or 110, respectively. A number of industry standards exist for definition of the command structures supported by such memory chip devices. One popular type of memory device is a synchronous dynamic random access memory (SDRAM). Double data rate SDRAMs (DDR SDRAMs) also support similar command structures and provide higher performance for memory operations. For example, JEDEC standard JESD79 provides a standardized specification for commands used in accessing DDR SDRAM devices (published by the JEDEC Solid State Technology Association in June of 2000 and available publicly at www.jedec.org). Similar command structures are defined for access to all SDRAM devices as well as other types of memory chip devices. A memory controller device responds to memory operations requested by the master device and translates the request into appropriate SDRAM commands in an appropriate sequence to store or retrieve the requested data to or from the memory chip devices.

Typical of such command structures is the inclusion of read burst and write burst commands to read or write a sequence of memory locations without requiring individual commands to be issued for each location to be read or written. The read and write commands each require certain preparatory steps be applied to the memory bank to be accessed. These steps represent a portion of the delay following issuance of a memory read request and return of the requested data. This portion of the delay is fixed for a particular application and is determined by fixed parameters of the memory controller and the memory chip devices selected for the application.

Another portion (a second portion) of the required delay between issuance of a read request and readiness of the data is a function of: bus timing specifications, signal propagation delays inherent in the specific system design, speed of components selected in the application and layout of the system design (i.e., routing of signal paths in the system). These and other factors contribute to portions of the required delay.

It is important to system performance in a multiple master system design that each master device receive certain read return control information at the appropriate time in its processing of a read request. Receiving the read return control information either too early or too late can impair overall system performance by unnecessarily locking the bus to preclude other overlapping operations on the bus by other master devices on the bus.

Though the first portion of the required delay is largely fixed and determined by the particular memory components selected, the second portion may be tuned for a particular application. In the past, designers would determine the ideal delay required in return of the read return control information that precedes return of the actual requested data. The system would be designed by the engineer with that ideal delay period fixed in the system design. As noted above, such a design lacks flexibility to easily port the memory controller design and adapt the design to new application environments.

In accordance with the present invention, memory controller 104 includes a programmable delay feature to permit rapid customization of the related design to a new application environment. In addition, the flexible features of the present invention include methods operable in a master device coupled to the memory controller to determine the optimal delay period setting for a particular application and to record the optimal value so determined in a configuration register for rapid, dynamic adaptation of the delay period for particular application of the memory controller.

FIG. 2 is a block diagram of the relevant portions of the memory controller 104 of the present invention in which a programmable delay line signal path 2 is used for return of read return control information. As used herein, "read return control information" preferably includes, for example, indicia as to the identity of the requesting master device so that read requests generated by multiple master devices may be matched with the corresponding return data, and may also include flags indicating the number of bytes in a FIFO and/or the status of information presently in the FIFO. Such a FIFO is typically used to buffer the data between the system processor bus and the memory controller device.

In particular, FIG. 2 is a block diagram depicting a programmable delay line signal path implemented within memory controller 104 of FIG. 1 in accordance with the present invention. Generally, RDINFO signals are generated by other features within the memory controller (not shown) and applied to path 250 as one input to each of multiplexors 200, 204, 208, 212, 216, 220, 224 and 228. By appropriate programming of these multiplexors, a selectable number of the delay flip-flops are interposed in the path from path 250 (RDINFO) to the ultimate output of delay line signal path, namely DELAYED RDINFO on path 252. The output of each multiplexor is applied to a corresponding delay flip-flop 202, 206, 210, 214, 218, 222, 226 and 230, respectively. Each pair comprising a multiplexor and its corresponding delay flip-flop is also referred to herein as a delay stage.

Each delay stage of the delay line signal path 2 receives read return control information (RDINFO) signals on path 250 as one of the inputs to the corresponding multiplexor of the stage. The multiplexor of each delay stage other than the first stage (multiplexor 200 and delay flip-flop 202) receives the output of the delay flip-flop from the preceding delay stage as a second input to the multiplexor. Each multiplexor also receives a corresponding selection control input via paths 254 indicating which input of each multiplexor is to be applied to the output and hence the input path of the corresponding delay flip-flop for the delay stage. As shown in FIG. 2 each selection input for each multiplexor is labeled SEL0 through SEL7.

The first delay stage consisting of multiplexor 200 and delay flip-flop 202 receives the output of its own delay flip-flop 202 as a second input to its corresponding multiplexor 200. Such a structure is known to those skilled in the art to latch the present value of the output of multiplexor 204 for a period of time during which the RDINFO signals are to be held in a valid state. By appropriately programming SEL0 through SEL7 for each of the depicted 8 delay stages, a master device may receive the delayed RDINFO signal with 1 through 8 clock delay periods imposed on the RDINFO signal.

Each subsequent delay stage (i.e., a delay stage comprising multiplexor 204 and corresponding delay flip-flop 206, a next delay stage comprising multiplexor 208 and corresponding flip-flop 210, etc.) also receives a selection signal from path 254. To impose a single cycle delay the RDINFO signal on path 250, only multiplexor 228 is selected to apply the RDINFO signal on path 250 to its output and hence the input of its corresponding delay flip-flop 230. The output of delay flip-flop 230 therefore generates a one clock period delayed version of RDINFO and applies it to path 252. In like manner, if a particular master device requires a two clock period delay, multiplexor 228 is programmed to pass the output of delay flip-flop 226 through to delay flip-flop 230 and thence on to path 252 to thereby achieve a two clock period delay signal. At the same time, multiplexor 224 is programmed to pass the RDINFO signal from its input path 250 to its corresponding delay flip-flop 226. Similarly, a full eight clock cycle delay period may be achieved by programming multiplexors (204, 208, 212, 216, 220, 224 and 228) to pass through the output of the earlier predecessor delay stage to apply its own delay. Multiplexor 200 of the first delay stage is programmed to forward the undelayed RDINFO signal through to delay flip-flop 202 of the first delay stage. In such a configuration, RDINFO signals on path 250 are delayed eight clock periods and then applied as a DELAYED RDINFO signal on path 252.

For completeness, FIG. 2 also depicts a simplified path for return of the actual requested data (as distinct from the read return control information applied to delay line signal path 2. Returned data is applied to path 260 as an input to FIFO 240. The output of FIFO 240 is applied to path 262 for forwarding to the requesting master device. Details of the signal path for return of the actual requested data are well-known to those of ordinary skill in the art and not relevant to the features of the present invention.

In one exemplary preferred embodiment of the present invention, the configuration of the delay stage multiplexors is determined by corresponding bits in a delay configuration register 242. A bit in delay configuration register 242 corresponds to each select control input of each multiplexor of the multiple delay stages (i.e., SEL0–SEL7). A desired configuration to customize the delay is therefore programmed into the register 242 to define the delay period to be imposed on return of read return control information to master devices in this application of the memory controller.

Those skilled in the art will readily recognize that the number of delay stages and hence the maximum delay that may be applied to the RDINFO signals is a matter of design choice based on the bus timing requirements of the particular application of the memory controller. Any number of delay stages may be designed into a memory controller in accordance with the present invention. The eight stages shown in FIG. 2 are there intended merely as exemplary of one such design choice that may be appropriate to a particular application.

FIG. 3 is a flowchart of a method of the present invention whereby a programmable master device (i.e., a general or special purposes processor) coupled to the memory controller determines the optimal delay period for read requests through the memory controller. Element 300 is first operable to set the delay configuration register of the memory controller to a next (first) value. Element 302 then measures memory bandwidth utilization between this master device and the memory subsystem using this first delay configuration. Those skilled in the art will readily understand numerous well-known techniques for such measurements. In general, such a measurement issues a number of memory read requests of varying burst lengths and determines the bandwidth from those accesses.

Element 304 then temporarily stores the value so determined while other configurations are tested. Element 306 then determines if other configurations of the delay are yet to be tested. If so, processing continues by looping back to element 300 to set a next delay configuration value and to test that next setting. If all configurations have been tested, element 308 is operable to set the delay configuration register to the value that corresponds to the optimal bandwidth utilization as measured by element 302 and stored by element 304 for comparison with other values.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for controlling access to a memory by a master device comprising:
   a programmable delay line signal path having an input signal path and an output signal path coupled to said master device;
   read return logic circuits associated with said memory and coupled to said input signal path of said programmable delay line signal path wherein read return control signals generated by said read return logic circuits are delayed by a programmable delay period and wherein the delayed read return control signals are applied through said output signal path of said programmable delay line signal path to said master device to control return of information read from said memory by said master device.

2. The system of claim 1 wherein said programmable delay line signal path comprises:
   a plurality of delay flip-flops coupled in a sequential manner such that the output signal from a preceding delay flip-flop is controllably applied to the input of a next delay flip-flop and such that the output of the last delay flip-flop in the sequence of delay flip-flops is applied as said output signal path of said programmable delay line signal path to said master device as delayed read return logic.

3. The system of claim 2 wherein each of said delay flip-flops has an input and wherein said read return control signals are selectively applied to said input of each of the delay flip-flops.

4. The system of claim 3 further comprising:
   a configuration register having a plurality of bits wherein each bit is associated with a corresponding delay flip-flop of said plurality of delay flip-flops such that the setting of said each bit controls the selective application of said read return control signals to said corresponding delay flip-flop.

5. The system of claim 1 wherein said programmable delay line further comprises:
   a first delay stage comprising a multiplexor and an associated first delay flip-flop wherein the output of said multiplexor is coupled to the input of said associated first delay flip-flop and wherein a first input of said multiplexor is coupled to the output of said multiplexor and wherein a second input of said multiplexor is coupled to said read return control signals and wherein the selection input of said multiplexor is coupled to a control signal to selectively enable passage of said read return control signals through said multiplexor for application to said associated first delay flip-flop; and
   a subsequent delay stage comprising a subsequent multiplexor and an associated subsequent delay flip-flop wherein the output of said first associated delay flip-flop is coupled to a first input of said subsequent multiplexor and wherein said read return control signals are applied to a second input of said subsequent multiplexor and wherein the output of said subsequent multiplexor is coupled to the input of said associated subsequent delay flip-flop and wherein the selection input of said subsequent multiplexor is coupled to a control signal to selectively enable passage of said read return control signals through said subsequent multiplexor for application to said associated subsequent delay flip-flop and wherein the output of said associated subsequent delay flip-flop is coupled to said output signal path of said programmable delay line signal path.

6. The system of claim 5 further comprising:
   a configuration register having a plurality of bits wherein each bit is associated with a corresponding delay stage such that the setting of said each bit controls the selective application of said read return control signals to the corresponding delay flip-flop of said delay stage.

7. The system of claim 1, wherein the read return control signals includes indicia as to an identity of said master device so that a read request generated by said master device is matched with corresponding return information.

8. The system of claim 1, wherein the read return control signals includes flags indicating a number of bytes in a FIFO.

9. The system of claim 1, wherein the read return control signals includes a status of the information presently in a FIFO.

10. A method for flexibly optimizing latency delays associated with a memory subsystem coupled to a master device through a memory controller comprising the steps of:
   a) programming a programmable delay line signal path to a selected delay value wherein said programmable delay line signal path interposes a delay on return of read return control information from said memory subsystem;

b) measuring memory bandwidth utilization between said master device and said memory subsystem;

c) repeating steps a) and b) for all possible delay values;

d) determining the optimal delay value corresponding to the optimal memory bandwidth utilization measured by step b); and e) programming said programmable delay line signal path to use said optimal delay value.

11. The method of claim 10 wherein said programmable delay line signal path includes a delay configuration register and wherein the step a) of programming comprises the step of: storing said selected delay value in said delay configuration register, and wherein the step e) of programming comprises the step of: storing said optimal delay value in said delay configuration register.

12. A memory controller adapted to flexibly customize delay in return of read return control information in a system coupling multiple master devices to a memory through said memory controller, said memory controller including:

programmable delay means having an input signal path and an output signal path coupled to a master device;

read return logic means associated with said memory and coupled to said input signal path of said programmable delay means wherein read return control signals generated by said read return logic means are delayed by a programmable delay period and wherein the delayed read return control signals are applied through said output signal path of said programmable delay means to said master device to control return of information read from said memory by said master device.

13. The memory controller of claim 12 wherein said programmable delay means comprises:

delay flip-flop means coupled in a sequential manner such that the output signal from a preceding delay flip-flop means is controllably applied to the input of a next delay flip-flop means and such that the output of the last delay flip-flop means in the sequence of delay flip-flop means is applied as said output signal path of said programmable delay means to said master device as delayed read return logic.

14. The memory controller of claim 13 wherein each of said delay flip-flop means has an input and wherein said read return control signals are selectively applied to said input of each of the delay flip-flop means.

15. The memory controller of claim 14 further comprising:

configuration register means having a plurality of bits wherein each bit is associated with a corresponding delay flip-flop means of said plurality of delay flip-flop means such that the setting of said each bit controls the selective application of said read return control signals to said corresponding delay flip-flop means.

16. The memory controller of claim 12 wherein said programmable delay means further comprises:

first delay stage means comprising multiplexor means and an associated first delay flip-flop means wherein the output of said multiplexor means is coupled to the input of said associated first delay flip-flop means and wherein a first input of said multiplexor means is coupled to the output of said multiplexor means and wherein a second input of said multiplexor means is coupled to said read return control signals and wherein the selection input of said multiplexor means is coupled to a control signal to selectively enable passage of said read return control signals through said multiplexor means for application to said associated first delay flip-flop means; and subsequent delay stage means comprising a subsequent multiplexor means and an associated subsequent delay flip-flop means wherein the output of said first associated delay flip-flop means is coupled to a first input of said subsequent multiplexor means and wherein said read return control signals are applied to a second input of said subsequent multiplexor means and wherein the output of said subsequent multiplexor means is coupled to the input of said associated subsequent delay flip-flop means and wherein the selection input of said subsequent multiplexor means is coupled to a control signal to selectively enable passage of said read return control signals through said subsequent multiplexor means for application to said associated subsequent delay flip-flop means and wherein the output of said associated subsequent delay flip-flop means is coupled to said output signal path of said programmable delay means.

17. The memory controller of claim 16 further comprising:

configuration register means having a plurality of bits wherein each bit is associated with a corresponding delay stage means such that the setting of said each bit controls the selective application of said read return control signals to the corresponding delay flip-flop means of said delay stage means.

\* \* \* \* \*